(12) United States Patent
Denne et al.

(10) Patent No.: US 8,376,715 B2
(45) Date of Patent: Feb. 19, 2013

(54) ARTIFICIAL LIFT STRUCTURES

(75) Inventors: Phillip Denne, Bournemouth (GB); Neil T. Montgomery, Red Deer (CA)

(73) Assignee: Crostek Management Corp., Red Deer, Alberta (CA)

( * ) Notice: Subject to any disclaimer, the term of this patent is extended or adjusted under 35 U.S.C. 154(b) by 766 days.

(21) Appl. No.: 12/389,033

(22) Filed: Feb. 19, 2009

(65) Prior Publication Data

US 2009/0226330 A1 Sep. 10, 2009

(30) Foreign Application Priority Data

Feb. 19, 2008 (GB) .................................. 0802964.7

(51) Int. Cl.
 *F04B 35/04* (2006.01)
(52) U.S. Cl. .......................................... 417/45; 700/282
(58) Field of Classification Search ................. 417/44.1, 417/44.11, 45, 410.1, 416, 417; 310/12.21, 310/12.22, 12.23, 12.24, 12.25, 12.26, 12.13, 310/12.09, 12.31, 12.11, 15
See application file for complete search history.

(56) References Cited

U.S. PATENT DOCUMENTS

| | | | |
|---|---|---|---|
| 2,112,888 A | 4/1938 | Greenawalt | |
| 3,405,605 A | 10/1968 | Ross | |
| 4,102,394 A | 7/1978 | Botts | |
| 4,114,375 A | 9/1978 | Saruwatari | |
| 4,201,115 A | 5/1980 | Ogles | |
| 4,353,220 A | 10/1982 | Curwen et al. | |
| 4,438,628 A | 3/1984 | Creamer | |
| 4,463,828 A | 8/1984 | Anderson | |
| 4,501,119 A | 2/1985 | Stanton | |
| 4,687,054 A | 8/1987 | Russell et al. | |
| 4,768,595 A | 9/1988 | Smith | |
| 5,196,770 A | 3/1993 | Champs et al. | |
| 5,440,183 A | 8/1995 | Denne | |
| 5,960,875 A | 10/1999 | Beauquin et al. | |
| 6,506,030 B1 * | 1/2003 | Kottke | 417/328 |
| 7,373,971 B2 | 5/2008 | Montgomery | |
| 2002/0134546 A1 | 9/2002 | Zupanick | |

FOREIGN PATENT DOCUMENTS

| | | |
|---|---|---|
| CA | 2250739 | 10/1997 |
| CA | 2222459 | 5/1999 |
| WO | 99/14724 A1 | 3/1999 |
| WO | 2008/032080 A2 | 3/2008 |

* cited by examiner

*Primary Examiner* — Anh Mai
*Assistant Examiner* — Brenitra M Lee

(57) ABSTRACT

This invention demonstrates an improved method of constructing an artificial lift device for deep wells, in which the deadload of the pump mechanism is supported by a continuously-controlled gas spring. The reciprocating motion is produced by a very unusual form of linear motor using a plurality of radially disposed conducting vanes and having no wire coils. The machine is highly efficient and is able to deduce many of the conditions obtaining at the pump by computations from the measured power demand at each point of the pumping cycle. The device is self-protecting and self-optimising.

19 Claims, 5 Drawing Sheets

ARTIFICIAL LIFT STRUCTURES

CROSS-REFERENCE TO RELATED APPLICATIONS

This application claims benefit from British Patent Application No. GB0802964.7, filed Feb. 19, 2008.

FIELD OF THE INVENTION

The present invention relates to a mechanism to lift liquids from a deep well or borehole by means of a reciprocating pump and more particularly, the present invention relates to a reciprocating mechanism connected to a polished rod inherent in "jack pump" mechanisms.

BACKGROUND OF THE INVENTION

In such a "jack pump" mechanism, a piston and non-return-valve unit at the base of the well or borehole (which may be several thousand meters deep) is generally connected to a drive mechanism at the surface by means of a long steel rod that, being assembled in sections and screwed together, is known as a string. The topmost section of that string—the section that emerges from the well through a pressure seal—necessarily has a higher surface finish and is known as the polished (or polish) rod.

It has long been known to construct such mechanisms in the form of an oscillating horizontal beam having a hammer-shaped end, over which is wrapped a chain or cable from which the pumping string is suspended. The opposite end of the beam is generally driven up and down by a cranked motor mechanism. Other, more complex, mechanisms exist in which, for example, the polished rod is suspended from a pulley or belt and in which the pulley or belt is raised and lowered by the rotation and contra-rotation of a winch mechanism. Nevertheless, the reciprocating beam or "nodding donkey" has remained the most popular device for moving a rod string. Reciprocating beams have been in use since the eighteenth century for pumping water from mines and the world's first steam engine was designed to drive such a pump.

It will also be understood that the long steel rod "string" that connects the drive mechanism at the top of the well with the pump itself at the base of the well has a deadload mass of several tonnes, which must also be supported by the beam. To increase the efficiency of the mechanism, the deadload has to be counterbalanced.

Although some recent mechanisms have used a gas spring (in the form of a pneumatic cylinder as a "prop" beneath the loaded end of the beam) it is more common for the counterbalance to be in the form of eccentric weights, attached to the shaft of the crank mechanism that drives the oscillating beam. (It will be recognised, however, that such a counterbalance technique doubles both the system inertia and the static bearing load.)

From earliest times the pumping stroke has traditionally been about ten feet (two or three meters) and the pumping frequency has been around 5 (between 1 and 10) strokes a minute. It will be understood that the traditional choices have been determined by the large masses involved and by the asymmetric action of the device, which places high stress on the parts and causes significant wear on the bearings of the "nodding donkey" mechanism.

The traditional machine has many moving parts and it is required to operate for 24 hrs a day, 365 days a year for several years and so it needs regular inspection, lubrication, maintenance and repair.

It will be further understood that pumping mechanisms in the past have been designed with regard to their mechanical function alone—that is to say, the process of their design has been entirely focused on providing a reliable method of raising and lowering a long pumping string within a shaft through which the liquid is itself raised on the upstroke of the pump. In the design of that mechanism no significant thought has been given to means of sensing the efficacy of the pumping operation or of reacting to special conditions that may strongly affect the loads on the pumping apparatus. For example, the mechanisms of the prior art do not generally incorporate within themselves the ability to sense and to react appropriately to conditions such as a dry well, a broken rod string or a stuck valve. Such conditions could only be discovered or diagnosed as a result of routine inspection and maintenance, and before that discovery the untreated condition will not only have stopped the pumping process, but may have been the cause of considerable damage to the pumping mechanism.

In recent years a variety of alternative systems have been devised, some using directly-applied hydraulic power to raise and lower the polished rod. Other alternatives have proposed the use of direct-acting linear electric motors, although none of them has been commercially successful. Co-pending patent applications GB 0713531.2 and PCT/GB2007/003482, the contents of which are incorporated herein by reference, consider that body of prior art and describe the general form of an electrical mechanism that is able both to fulfil the mechanical task of pumping and to deduce, in real time, the conditions occurring within the pump and its surroundings at the base of the well.

Other generally relevant prior art includes GB 0802964.7. This reference is specifically related to a pump or artificial lift mechanism and not for the design of an electrical machine of any particular kind. Likewise, WO 2008/032080 A2 is specifically directed to an electrical machine and not an artificial lift mechanism or pump of the type described in GB 0802964.7. WO 99/14724 although generally relevant, describes a pump or artificial lift mechanism. In U.S. Pat. No. 4,353,220, there is a description of a mechanism that deliberately makes the compressor a resonant machine along the operating axis of the machine. This is impossible for any artificial lift mechanism because the steel rod string between the electrical driver and the driven pump is usually about 6000 feet long and has a set of resonant frequencies that are naturally much greater than any operating frequency of the mechanism. Further, the rod string is surrounded by a viscous liquid that acts to damp out any such vibration. There is therefore no advantage in attempting to increase the efficiency of the artificial lift mechanism by inducing a longitudinal resonance in the rod. The gas spring in GB 0802964.7 stores and recycles energy by slow changes in the PV product which obtains when the machine is at mid-stroke. As a result, part of the braking force and part of the acceleration force needed at each end of the machine stroke can be taken from the energy differential in the compressed (or extended) spring. From an analysis of the prior art, it would appear that there is nowhere any reference to or illustration of, the specific use of a planar wireless motor.

SUMMARY OF THE INVENTION

One object of the present invention is to provide an improved artificial lift mechanism.

It is an object of this invention to provide a particular form of artificial lift mechanism by which fluid may be pumped from a deep well.

It is a further object of this invention to improve the performance of the artificial lift mechanism by the use of a novel form of electromagnetic actuator that does not use copper wires in its construction and which is, therefore, generally referred to as a wireless motor.

Yet another object of one embodiment of the present invention is to provide a mechanism for driving a reciprocating pump or an artificial lift device, comprising of a linear electric motor and a gas spring, the mass of gas in the spring not being preset, but being continually controlled in accordance with the current demands of the linear electric motor, integrated over a plurality of complete operating cycles of the reciprocating pump or artificial lift mechanism, characterised in that the electrical conductors of the machine are not wires, but patterned metal laminations without a dielectric substrate.

In the present invention the machine is contained within a vertical cylinder and comprises a plurality of radial conducting vanes forming the stator and a matching plurality of air gaps in a magnetic armature. The armature is constructed from a number of planar permanent magnets to which pole pieces are affixed, the permanent magnets and pole pieces being so arranged that the magnetic field is concentrated in the air gaps and that its direction alternates both axially and circumferentially. The armature is affixed to a central thrust tube that is extendible from one end of the vertical cylinder and is slideably sealed thereto.

The radial vanes of the stator are constructed from a plurality of insulated, patterned, non-ferrous metal laminations that are nested and overlaid so as to be a self-supporting structure with no substrate. The conducting laminations of each vane are arranged electrically to act as a three-phase servomotor, which is controlled by a conventional electronic drive.

The current drawn by the motor is continuously measured and the magnitudes are processed by a computer within the electronic drive unit.

The outer casing of the machine is sealed to withstand gas pressures of more than ten bar and is filled with dry nitrogen gas, the mass of gas within the casing being continuously adjusted in accordance with the time integral of the motor current that is measured by the electronic drive.

The shape of the profile of the motor current over each complete cycle is also processed so as to compute a number of key parameters of the pump, these being used to assess its performance in near real time and to make any necessary changes to the force, speed or amplitude of the motion, according to predetermined algorithms that optimise the pumping process.

The principal advantages of the invention include the following:

i) Those electromagnetic artificial lift mechanisms that have been previously proposed have lacked the necessary thrust capability—or have been unable to achieve that thrust at an acceptable price;

ii) The use of radially disposed electrical vanes having their own self-sufficient mechanical strength has allowed a construction in which there is no magnetic attraction between the armature and the stator;

iii) The high-intensity magnetic fields of the armature are closely contained within its structure and do not cause dangerous forces or eddy currents in any other part of the machine;

iv) The use of such high intensity magnetic fields increases the electrical efficiency of the machine;

v) There are only two seals which may require inspection and maintenance, both of which are easily accessible from the top of the structure;

vi) The use of pressurized dry nitrogen increases the heat transfer and excludes any inflammable gas;

vii) Continuous tuning of the gas spring minimizes electrical power demand;

viii) The machine is fully enclosed and there are no exposed moving parts that may cause injury to humans or animals nearby;

ix) The "top hat" protects the external surface of the thrust tube and the gas seal; and x) The machine is designed to act as a three-phase permanent-magnet brushless servo motor. In association with an electronic drive unit it is therefore possible for the machine to deduce from the profile of its current consumption a number of useful parameters of the well and of the pump to which it is connected.

In order that the invention may be more readily understood, reference will now be made to the accompanying drawings, which illustrate the principal features of the machine.

BRIEF DESCRIPTION OF THE DRAWINGS

Similar numerals used in the Figures denote similar elements.

DETAILED DESCRIPTION OF THE PREFERRED EMBODIMENTS

Figure 1:
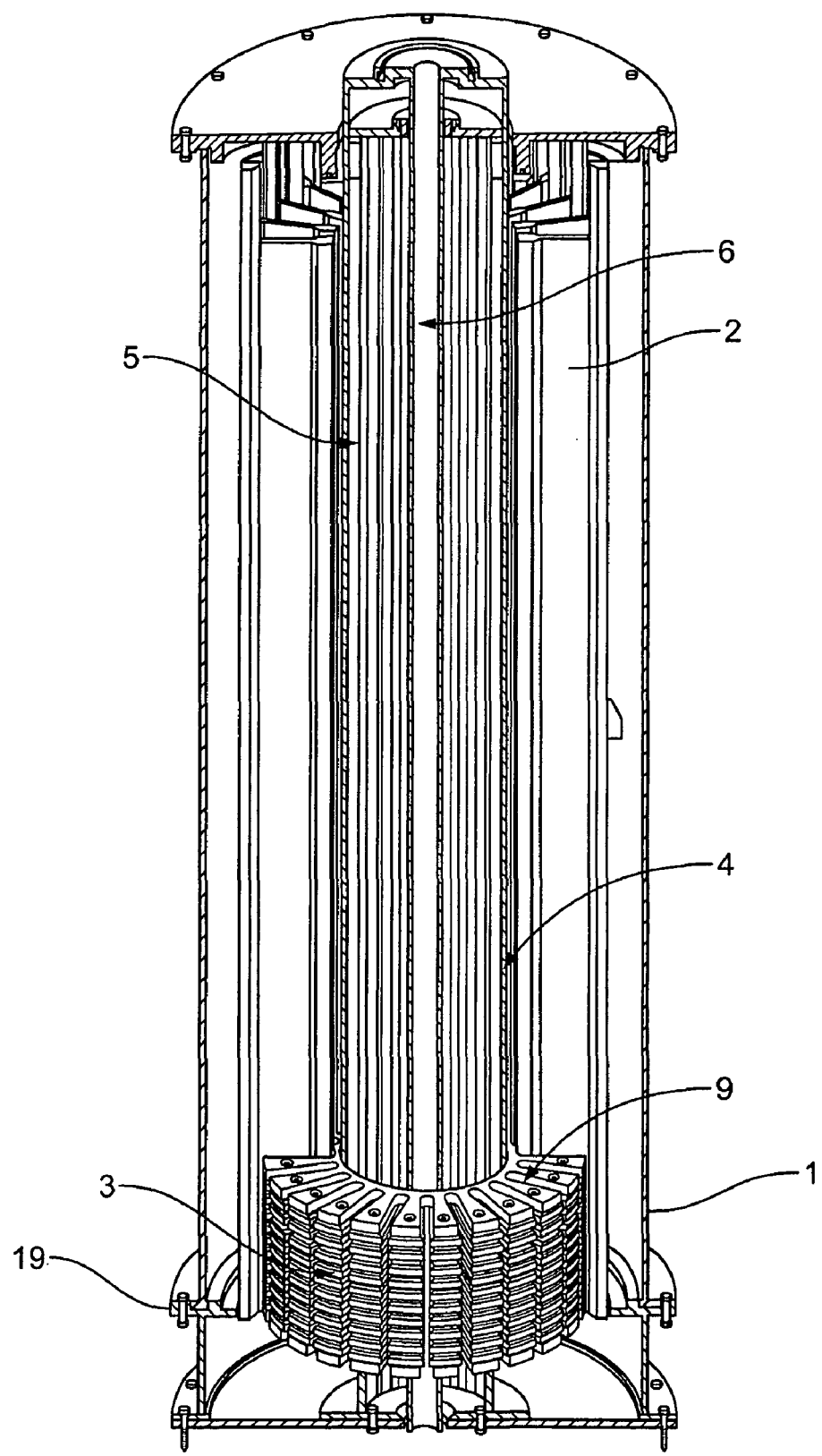
FIG. 1 is a diagrammatic cross-section of the artificial lift mechanism according to one embodiment.

Referring now to FIG. 1, shown is a diagrammatic cross-section of the artificial lift mechanism according to an embodiment which is wholly enclosed within the outer casing 1 and which also carries a "top hat" or extension cylinder (not shown) that is fitted to the top plate of the mechanism and includes a particulate filter so as to protect the thrust tube 4 from the external environment. The electrical conducting vanes 2 are fixed to the bottom plate 19 of the casing 1 and pass through radial slots in the magnetic armature 9. The vanes are electrically connected in series so that the currents flowing therein are synchronous and of identical magnitude. The magnets and pole piece units 3 of the armature 9 are arranged between the radial slots, so as to create a series of strong magnetic fields orthogonal to the electric currents flowing in the conducting vanes 2, thus producing a net electromagnetic force along the axis of the machine. The electromagnetic force is transferred to the thrust tube 4, which moves on bearings affixed the inner guide tube 5. When operating at a well, the polished rod of the pump mechanism passes up through the electromagnetic pumpjack via a core tube 6, which is open to the atmosphere at all times. The polished rod is clamped to a bearing that rests on the top cap of the thrust tube 4, so that vertical movements of the thrust tube are transferred to the pump via the rod string. The thrust tube guide bearings on the tube 5 are designed to resist a torque such as might be applied by a conventional rod rotator mechanism interposed the polished rod and the top of the thrust tube 4.

Figure 2:
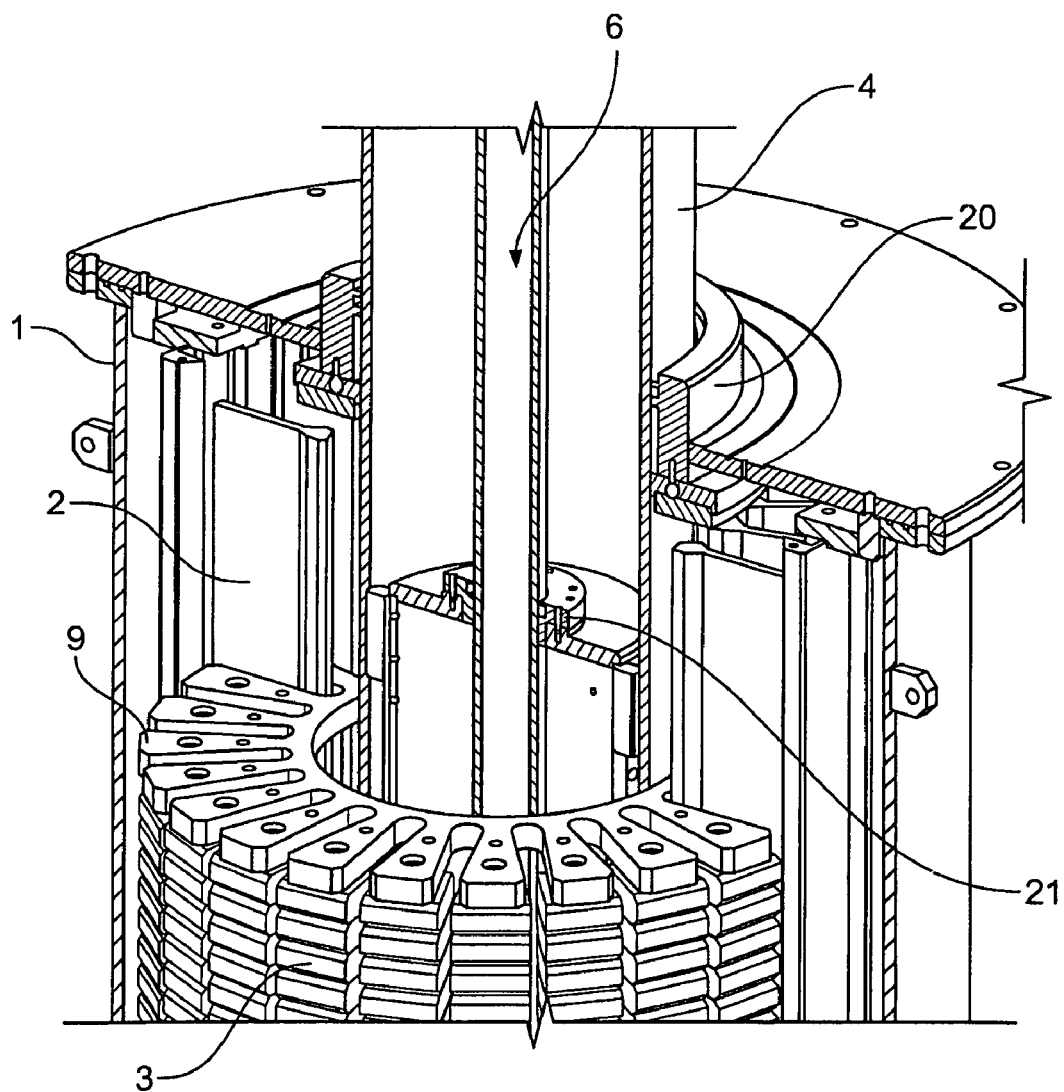
FIG. 2 is an enlarged sectional view of FIG. 1.

With reference to FIG. 2, shown is the configuration when the armature is close to the upper part of the machine illustrating, in particular, the thrust tube sliding seal 20 and the core tube sliding seal 21, which allow the volume within the casing 1 to be pressurised with dry nitrogen. It will be understood that one of the effects of that pressurization is to exert an upwards force on the thrust tube 4. When the correct degree of gas pressure is applied, the nitrogen acts as a gas spring supporting the deadload of the armature, thrust tube, pump rod string and oil column. It is a feature of this design that the mass of gas within the spring is varied continuously in accordance with the measured current consumption of the motor, which ensures that the minimum of electrical power is consumed by the mechanism. The other benefits of the pressurized nitrogen are that the electrical system is completely isolated from any inflammable gases and that the heat produced in the electrical vanes 2 is conducted more rapidly to the outer casing 1, so that the internal temperature remains low.

Figure 3:
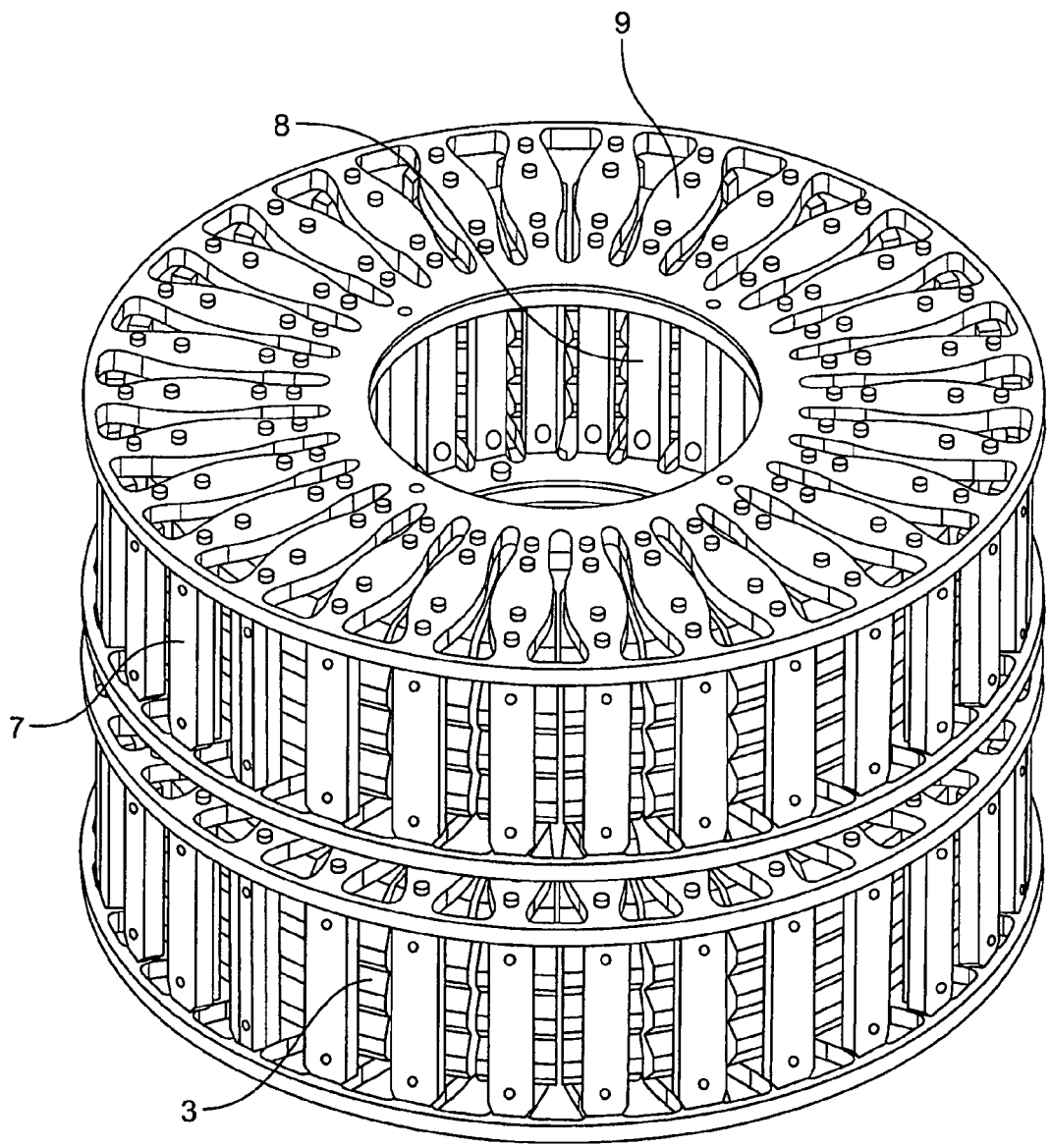
FIG. 3 is a perspective view of the armature in more detail.

Turning to FIG. 3, shown is the armature 9 in greater detail. It may be considered to consist of two modules of robust construction, in each of which short stacks of magnets and pole pieces 3 are clamped between the radial slots into which the stator vanes are inserted. The motion of the conducting vanes relative to the armature slots is held to the central region of those slots by outer guide bearings 7 and inner guide bearings 8.

Figure 4:
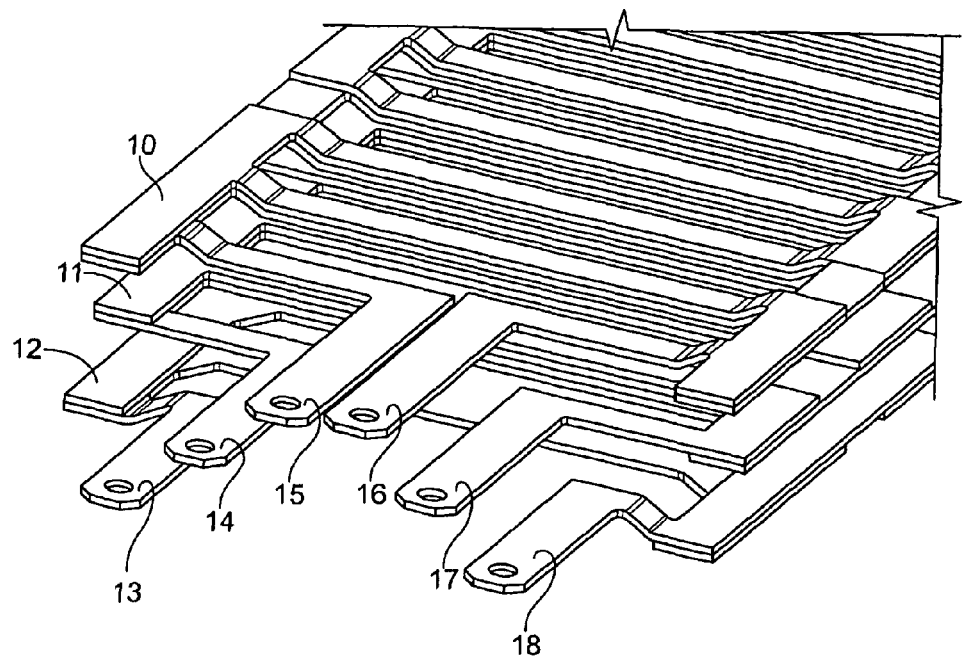
FIG. 4 is an enlarged sectional view of the three phase conductors that form the conducting vanes.

Referring to FIG. 4, shown is an enlarged sectional view the three phase conductors forming the conducting vanes. The phase conductors are separately cut from the metal sheet, insulated and laid one upon another before being brought together as illustrated. Each phase has two end terminals that are extended from the body of the vane and are numbered 13, 14, 15, 16, 17 and 18. It will be understood that the current enters each phase from one terminal and travels in alternating directions along the conducting lamination to the distant end. The upper lamination is reversed and laid upon the lower one, so that when the distant ends of the paired laminations are electrically connected, the current returns to the near end along the alternating path of the upper lamination in such a way as so as to reinforce the effect of the current flowing in the lower lamination.

Figure 5:
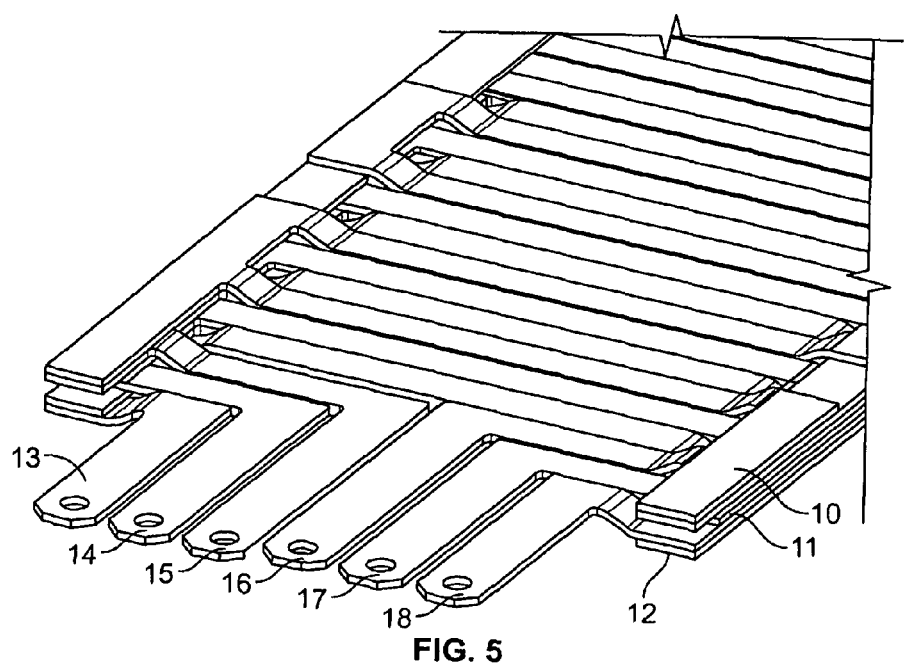
FIG. 5 illustrates how the laminations for the three separate phases are arranged to nest together in the central region and to overlap outside the magnetic field region.

FIG. 5 shows how the laminations for the three separate phases 10, 11 and 12 are arranged to nest together in the central region and to overlap outside the magnetic field region. It also shows how the terminations 13 through 18 remain clear of one another when the phases are nested.

Figure 6:
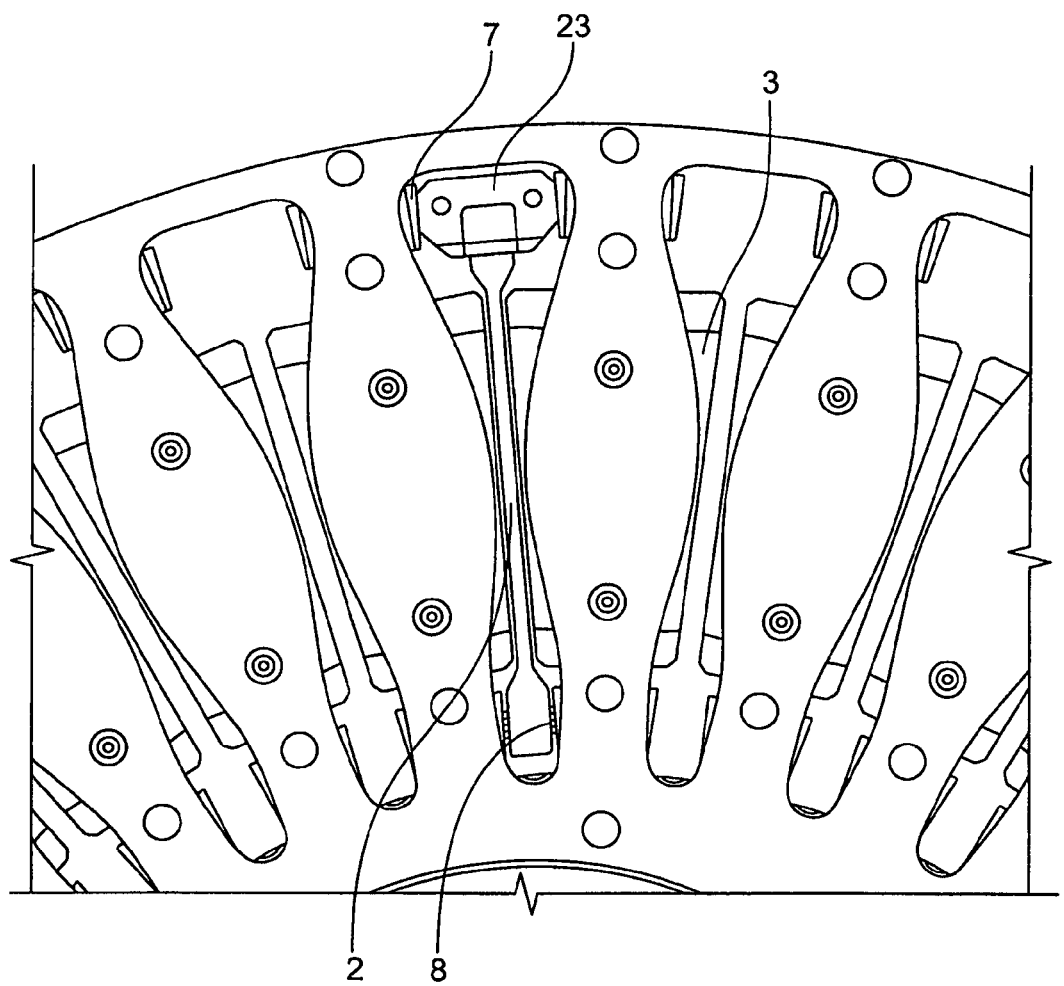
FIG. 6 is an enlarged sectional view of the magnetic armature and of an electrical conducting vane fitted into one of the slots thereof.

FIG. 6 is an enlarged sectional view of the magnetic armature and of an electrical conducting vane fitted into one of the slots thereof. The vane 2 is fitted into a rigid spine 23 along its outer length. Spine 23 is fitted with a hard metal bearing strip on both edges (the bearing strip is not shown here) and the strip comes into contact with the outer bearing blocks 7 if any misalignment should occur. Similar hard metal bearing strips are fitted to the outside of the inner edge of each vane and these may sometimes bear against the guide blocks 8 to prevent any misalignment.

Although embodiments of the invention have been described above, it is not limited thereto and it will be apparent to those skilled in the art that numerous modifications form part of the present invention insofar as they do not depart from the spirit, nature and scope of the claimed and described invention.

We claim:

1. A mechanism for driving a reciprocating pump or an artificial lift device, the mechanism comprising: a linear electric motor and a gas spring, the mass of gas in said spring not being preset but being continually controlled in accordance with the current demands of said linear electric motor, integrated over a plurality of complete operating cycles of said reciprocating pump or artificial lift mechanism, characterised in that electrical conductors of said linear electric motor are patterned metal laminations absent a dielectric substrate.

2. The mechanism in accordance with claim 1, wherein an armature of said motor includes a plurality of radial slots, in each of which there is a transverse permanent magnetic field.

3. The mechanism in accordance with claim 2, in which the direction of said permanent magnetic field transverse each radial slot of said armature alternates parallel to the axis of said linear electric motor.

4. The mechanism in accordance with claim 3, in which the direction of said permanent magnetic field transverse each radial slot of said armature alternates circumferentially.

5. The mechanism in accordance with claim 2, in which a stator of said linear electric motor includes a matching plurality of conductor vanes having a radial cross-section smaller than said slots of the magnetic armature and connected parallel to the axis of said linear electric motor.

6. The mechanism in accordance with claim 5, in which each armature slot further includes guide bearings.

7. The mechanism in accordance with claim 6, in which insulated metal strips are connected to edges of the conducting vanes that may come into contact with said guide bearings of the armature.

8. The mechanism in accordance with claim 5, in which the conducting vanes of said stator are configured as a three-phase electrical system.

9. The mechanism in accordance with claim 5, in which electrical components of said mechanism are completely enclosed within a gas-tight cylindrical outer casing.

10. A mechanism for driving a reciprocating pump or an artificial lift device, the mechanism comprising: a linear electric motor and a gas spring, the mass of gas in said spring not being preset but being continually controlled in accordance with the current demands of said linear electric motor, integrated over a plurality of complete operating cycles of said reciprocating pump or artificial lift mechanism, characterised in that electrical conductors of said linear electric motor are patterned metal laminations absent a dielectric substrate, wherein an armature of said motor includes a plurality of radial slots, in each of which there is a transverse permanent magnetic field, in which a stator of said linear electric motor includes a matching plurality of conductor vanes having a radial cross-section smaller than said slots of the magnetic armature and connected parallel to the axis of said linear electric motor, in which the axis of said linear electric motor is substantially vertical and said armature is connected to a thrust tube, said thrust tube being extendable through a bearing and sliding gas seal at the top of said cylindrical outer casing.

11. The mechanism in accordance with claim 10, in which said cylindrical outer casing is filled with a pressurized fire-suppressant gas.

12. The mechanism in accordance with claim 11, in which the mass of gas within said casing is continuously controlled in accordance with the current demands of said linear electric motor.

13. The mechanism in accordance with claim 11, including a tube open to the atmosphere and connected to said thrust tube along the central axis of said linear electric motor, said tube being fitted with a bearing and a sliding gas seal to prevent leakage of said pressurized gas from within the main volume of said casing.

14. The mechanism placed immediately above the well and constructed or artificial lift device accordance with claim 13, in which a polished rod of the pump is passed upwards through said tube and connected to the top of said thrust tube.

15. The mechanism in accordance with claim 14, in which current supplied to the stator of said linear electric motor causes said thrust tube to follow a reciprocating motion, so as to pump fluid from the well.

16. The mechanism in accordance with claim 15, in which the pressure of the gas within said casing supports deadload and recycles a portion of kinetic energy of the system.

17. The mechanism in accordance with claim 16, to the top of which there is connected a protective casing having at least one aperture open to the atmosphere and including a filter for particulates.

18. The mechanism in accordance with claim 16, in which current consumed by said mechanism is monitored continuously throughout each pumping cycle, the values of those currents being processed by a computer so as to extract information relating to the parameters of the well and the condition of the pump.

19. The mechanism in accordance with claim 18, including an electronic drive unit programmed to optimize the pumping rate and to protect the pump from damage consequent upon a malfunction.

* * * * *